Jan. 15, 1963    M. J. MORIARTY    3,073,288
INTERNAL COMBUSTION ROTARY PISTON ENGINE AND THE LIKE
Filed April 6, 1960    3 Sheets-Sheet 1
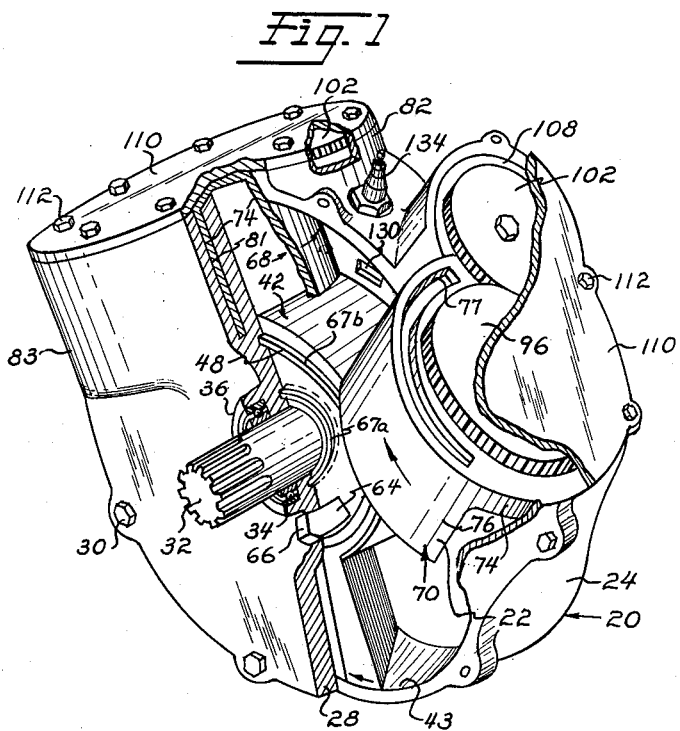
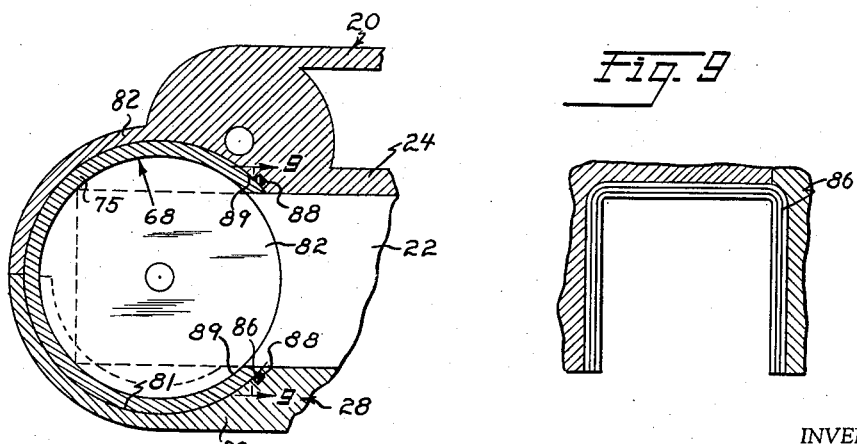
INVENTOR
*Maurice J. Moriarty*
BY *Norris & Bateman*
ATTORNEYS Jan. 15, 1963  M. J. MORIARTY  3,073,288
INTERNAL COMBUSTION ROTARY PISTON ENGINE AND THE LIKE
Filed April 6, 1960  3 Sheets-Sheet 2

INVENTOR
Maurice J. Moriarty
BY
ATTORNEYS

INVENTOR
Maurice J. Moriarty

BY Norris & Bateman

ATTORNEYS

United States Patent Office 3,073,288
Patented Jan. 15, 1963

3,073,288
INTERNAL COMBUSTION ROTARY PISTON
ENGINE AND THE LIKE
Maurice J. Moriarty, Hazardville, Conn.
(4916 W. Indianola, Phoenix 31, Ariz.)
Filed Apr. 6, 1960, Ser. No. 20,456
1 Claim. (Cl. 123—13)

The present invention relates to rotary fluid motors, pumps, engines and the like and more particularly to those of the positive displacement type wherein movement of the power piston is rotary.

Devices of this type toward which the instant invention is particularly directed, basically consist of a rotatable rotor enclosed within a casing and forming an annular piston chamber with the internal wall surface of the casing. One or more vanes or pistons rigidly mounted on the rotor radially project into the piston chamber in close running clearance with the internal wall surfaces of the casing. When the device is employed as a pump, the rotor is driven by an external power source and the rotating vane in the fluid chamber serves to compress the fluid introduced into the piston chamber. When the device is employed as an engine, a charge of a compressed combustible mixture is introduced into the chamber to the rear of the vane and upon ignition thereof expands to drive the vane and, consequently, the rotor.

A preferred application of the present invention is in connection with internal combustion rotary engines having a rotor driven engine shaft and spaced partition members which are movable in timed relation to the rotation of the rotor vane to form a transverse partition wall across the piston chamber thereby dividing the chamber into compartments where the intake, compression, ignition and exhaust cycles of the engine take place.

According to the prior conventional internal combustion rotary engine constructions, a set of at least two angularly spaced apart reciprocably mounted gates or abutments are adapted to move to and from positions where they form the transverse partition walls across the piston chamber. These sliding abutments forming the compression, expansion and exhaust compartments in the piston chamber, may be reciprocated back and forth in recesses formed in either the casing or the rotor and are usually driven by a rotor driven engine shaft through a cam mechanism which serves to translate the rotary motion of the engine shaft into reciprocating motion. According to these prior conventional constructions, the inlet and outlet ports for the fuel charge are generally controlled by movable valve members which are operated generally by cam means in timed relationship with the movement of the rotor vane and with the sliding abutments.

In accord with the instant invention, the relatively complicated cam structure for the intake and exhaust valves and the sliding chamber dividing abutment structure has been replaced with highly effective and simplified construction wherein angularly spaced apart cylindrical abutments or gates having a hollow interior are rotatably mounted about axes contained in a plane extending generally normal to the rotational axis of the rotor. By this construction, the rotary motion of the driven engine shaft does not have to be translated into reciprocal motion for shifting the abutments back and forth, and the abutments, being rotatably mounted may be driven at constant speed by a simplified drive train.

A further disadvantage of the prior art rotary engine constructions is that pockets often are provided into which the fuel charge is compressed and ignited and then allowed to expand out of the pockets and into the annular piston chamber for driving the rotor vanes. This structure tends to reduce the amount of energy imparted by the expanding gases to the rotor vanes.

In further accord with the present invention, a unique by-pass arrangement eliminates the necessity of these pockets and facilitates ignition of the compressed fuel charge in compartments formed entirely within the annular piston chamber.

It is, accordingly, a primary object and purpose of the present invention to provide a new and improved rotary piston engine, motor, pump or the like having a novel rotary gate or abutment movable in a single direction to form a transverse partition wall across an annular piston chamber in which a piston or vane is rotating.

Another important object of the present invention resides in the provision of a rotary engine including a casing defining a piston chamber, a rotor journalled therein and a piston fixed on the rotor for rotation in an annular space formed by the rotor and the casing wherein novel means are provided for introducing, burning and purging a combustible charge of fuel to drive the engine piston.

A further object of the present invention is to provide a novel rotary engine including a rotor having a vane thereon wherein a combustible charge of fuel is compressed in advance of the vane and is transferred to the rear of the vane where it is ignited.

Still a further important object of the present invention is to provide a rotary engine having a rotor enclosed in a cylindrical housing and forming an annular piston chamber therewith wherein novel rotary gates or abutments are movable in a single predetermined direction to periodically form transverse partitions across the piston chamber thereby dividing the chamber into compartments in timed relation with the engine piston where intake, compression, ignition and exhaust cycles of the engine take place.

Still another object of the present invention is to provide a novel constant speed gate or abutment in a rotary piston engine, motor, pump or the like.

Another object of the present invention is to provide an improved rotary engine, motor, pump or the like which can be economically manufactured, which is simple in operation, which is highly efficient in use and which is subject to less wear.

It is a further object to provide a novel rotary engine, motor, pump or the like comprising a minimum number of structurally rugged compactly arranged parts which are readily accessible for maintenance and inspection.

A further object of the present invention is to provide a fuel inlet and exhaust port arrangement in a rotary piston engine wherein the necessity of movable valve members for controlling the introduction of a fuel charge and the exhaust of the expanded fuel charge is eliminated.

Further objects and advantages will become apparent as the description proceeds in connection with the accompanying drawings wherein:

FIGURE 1 is a perspective view of a rotary engine according to a preferred embodiment of the invention with the casing and cover partially broken away and with the engine rotor rotated to a position where the exhaust gases are purged from the combustion chamber;

Figure 2:
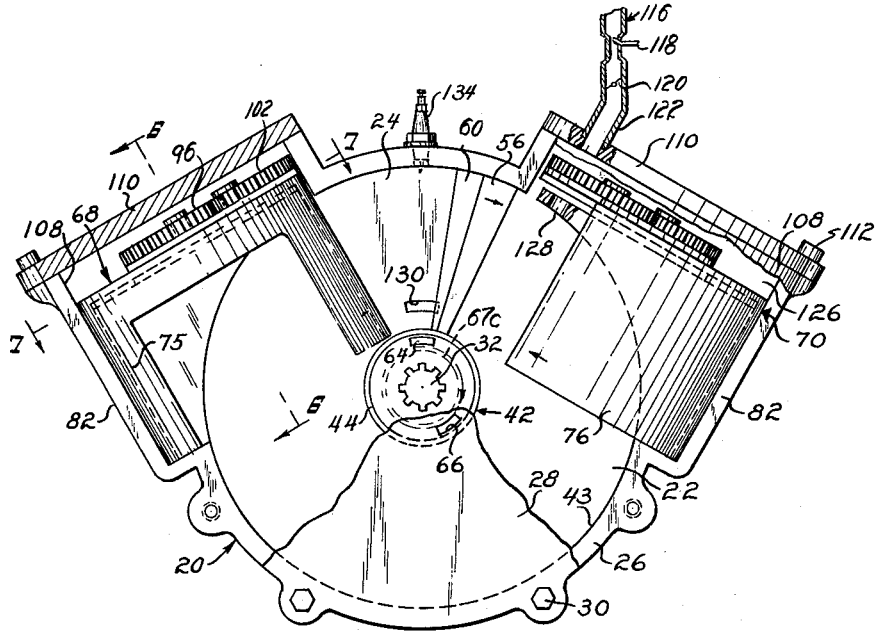
FIGURE 2 is a front elevational view of the engine shown in FIGURE 1 with the casing cover plate partially broken away and with the engine rotor rotated to a position between the abutment valves.
Figure 8:
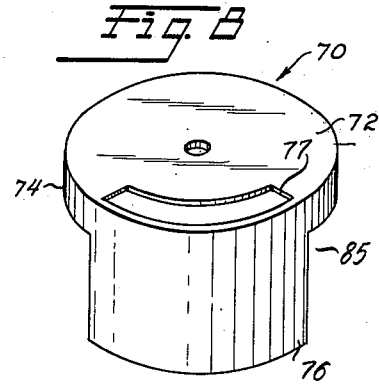
Figure 6:
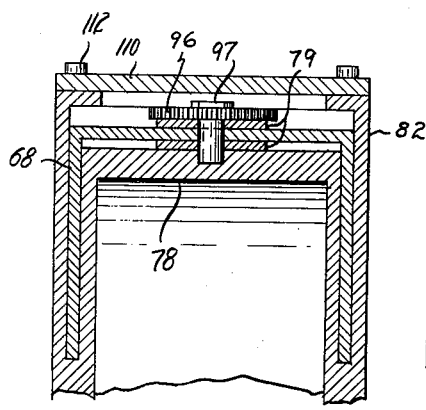
Figure 10:
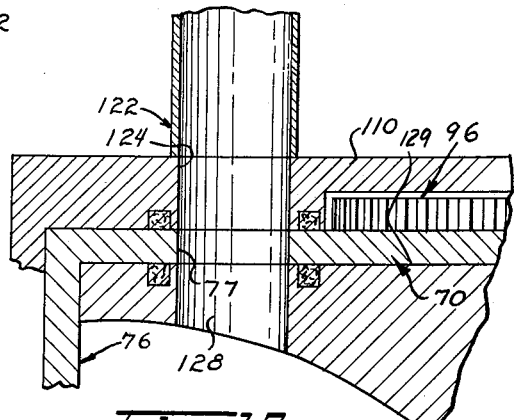

FIGURE 6 is a section along lines 6—6 of FIGURE 2;
FIGURE 7 is a section along lines 7—7 of FIGURE 2;
FIGURE 8 is a perspective view of the right-hand abutment valve shown in FIGURE 1;
FIGURE 9 is a section along lines 9—9 of FIGURE 7; and
FIGURE 10 is a section substantially along lines 10—10 of FIGURE 3.

Figure 3:
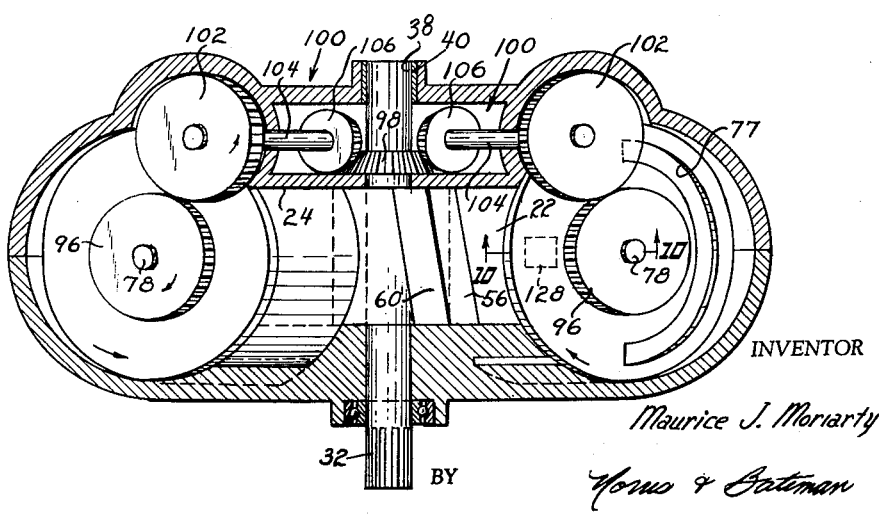
FIGURE 3 is a top plan view of the engine shown in FIGURE 2 with the engine casing and cover plate partially broken away to show interior details of construction.

Referring now to the drawings and more particularly to FIGURES 1–3, the rotary piston engine construction 10 embodying the principles of the present invention comprises a casing 20 which houses a cylindrical walled piston chamber 22 formed by an upright wall 24 and a generally annular skirt 26. As best shown in FIGURES 1 and 2, casing 20 has an open side providing access to the component parts of the engine positioned therein and is enclosed by a cover plate 28 secured to skirt 26 as by screws 30. An engine output shaft 32 is mounted centrally of casing 22 and extends beyond cover 28. As viewed from FIGURE 1, shaft 32 is journalled at its left-hand end by means of a conventional ball bearing assembly 34, the outer race of which is press fitted into an apertured boss 36 formed in cover plate 28 and projecting outwardly therefrom. The opposite end of shaft 32 is journalled in a bore 38 formed in casing 20 by means of a bushing 40 of bearing material, as best shown in FIGURE 3.

Within casing 20 is a rotor 42 which is fixedly keyed to shaft 32 in spaced concentric relationship to the internal cylindrical surface 43 of casing 20 and which comprises a solid body 44 having a cylindrical peripheral surface flanked by flat side surfaces in running clearance with casing wall 24 and the internal flat surface of cover 28.

With reference now to FIGURES 1–4, rotor 42 is provided with a single vane 56 which is rigidly fixed to rotor body 44 and which extends radially beyond the cylindrical peripheral surface of rotor body 44. Vane 56 diverges somewhat outwardly and the end face thereof is slightly curved to interfit the cylindrical skirt surface 43 with a running clearance. Rotor body 44 and vane 56 are preferably of one-piece construction. The leading face 58 of vane 56 is preferably inclined at an obtuse angle with cover 28 as shown in FIGURE 3 for a purpose as will become apparent. The trailing face 60 of vane 56 may be of any shape and is preferably slightly inclined as shown.

In order to exhaust expanded burned gases at the rear of vane 56 in chamber 22, rotor body 44 is provided with an uninterrupted curved passage 62 which opens into chamber 22 to the rear of the vane trailing face 60 and with a port 64 formed in the side surface of rotor body 44 facing cover 28. Upon rotation of rotor 42, port 64 is moved into and out of registry with a port 66 which is formed in cover 28 and which communicates with the atmosphere. By this structure, exhaust products in chamber 22 to the rear of vane 56 are purged to atmosphere through rotor passage 62 whenever port 64 is brought into registry with port 66.

When rotor port 64 is rotated out of registry with casing port 66, the body of rotor 42 seals off the passageway connecting chamber 22 with the atmosphere.

Figure 4:
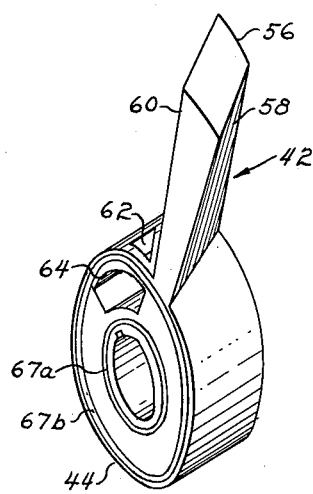
FIGURE 4 is an enlarged perspective view showing the rotor of the engine illustrated in FIGURE 1.

As shown in FIGURES 1, 3 and 4, the side surface of rotor 42 facing cover 28 is sealed fluid tight with cover 28 by means of a pair of concentrically spaced apart labyrinth seal rings 67a and 67b or the like. Rings 67a and 67b are positioned in opposed mating annular grooves formed in flat inner surface of cover 28 and the opposed side surface of rotor body 44. As best shown in FIGURE 1, rings 67a and 67b are respectively positioned radially inwardly and outwardly of ports 64 and 66. By the sealing effect provided by rings 67a and 67b, leakage between cover 28 and the opposed side face of rotor body 44 from either chamber 22 or from ports 64 and 66 is substantially precluded.

The opposite side of rotor body 44 is sealed fluid tight with casing wall 24 by means of a labyrinth seal ring 67c (FIGURE 3) or the like which is positioned in opposed mating annular grooves formed in the inner flat surface of casing wall 24 and the opposed interfitting flat side surface of rotor body 44.

In order to prevent leakage between the side surfaces of vane 56 which interfit in running clearance with the inner faces of cover 68 and casing wall 24, lubricant may be introduced by any suitable means (not shown) to form a film between these relatively moving interfitting surfaces and thereby effectively seal vane 56 fluid tight with wall 24 and cover 28. A lubricant film may also be utilized to seal the side surfaces of rotor body 44 with cover 28 and casing wall 24 in place of seal rings 67a, 67b, and 67c.

Figure 5:
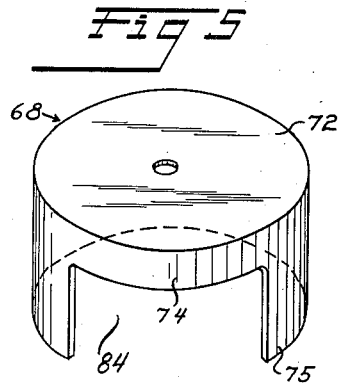
FIGURE 5 is a perspective view of the left-hand abutment valve shown in FIGURE 1.

In accordance with the present invention, casing 20 carries a rotary ignition cycle valve 68 and a rotary compression cycle valve 70. As best shown in FIGURE 5, valve 68 is preferably of hollow cylindrical form having a flat sided circular end wall 72 and a cylindrical skirt 74 integrally depending from wall 72 and open at its bottom end. Skirt 74 is provided with a semi-cylindrical abutment 75 which extends longitudinally from the bottom edge of skirt 74 and which has an arcuate extent of substantially 190°.

With reference to FIGURE 8, the construction of valve 70 is identical to that of valve 68 except that the semi-cylindrical abutment which depends from skirt 74 is identified by the reference numeral 76, and has an arcuate extent of substantially 230°. The end wall 72 of valve 70 is further provided with an arcuate fuel intake port 77 which is positioned so that it is diametrically adjacent to abutment 76 and terminates at both ends just short of the side edges of abutment 76.

The means for rotatably mounting valves 68 and 70, are identical and, therefore, the detailed description will be limited to only one valve but will be equally applicable to both. Identical reference numerals refer to identical elements of the valves and their mounting means.

Thus, with reference to FIGURE 6, each valve 68 and 70 is rotatably mounted on a pin 78 which coaxially extends through wall 72 with its axis contained in a plane passing normally to the rotational axis of shaft 32 and which is fixedly secured to casing 20. Radial and thrust bearing assemblies 79 which are positioned one on each side of wall 72 suspend valve 68 or 70 in casing 20 for rotation about pin 78. Skirt 74 is positioned with a running fit to ride in a circumferential channel 81 formed in the built up casing portion 82 of casing 20 and an enlarged portion 83 of cover 28.

As best shown in FIGURES 2 and 7, each channel 81 defines a circle which transversely intersects chamber 22 along an inward segmetal portion thereof. By this construction, skirt 74 is rotatable in channel 81 so that abutment 75 or 76 depending therefrom move generally transversely across chamber 22.

The axial lengths of abutments 75 and 76 extending downwardly from the free bottom edges of skirts 74 are slightly greater than the radial distance between rotor 42 and the internal cylindrical casing wall surface 43 so that when valves 68 and 70 are assembled in the engine, skirts 74 do not project into chamber 22. As will be clear from FIGURES 5 and 8, abutments 75 and 76 respectively form circumferential openings 84 and 85 with their respective skirts 74. By this structure, movement of vane 56 past valves 68 or 70 is accomplished by rotating valves 68 and 70 to positions where abutments 75 and 76 are withdrawn from chamber 22 and openings 84 and 85 extend across chamber 22. Thus, vane 56 can be rotated through openings 84 and 85 and, as a consequence, past valves 68 and 70.

In order to seal each skirt 74 fluid tight with casing 20, a seal 86 of carbon or like material is disposed, as best seen in FIGURES 7 and 9 in an inverted U-shaped continuous groove 88 formed in the semi-cylindrical surface 89 of casing 20 and cover 28 which defines the outer wall surface of channel 81. Groove 89 is positioned to straddle chamber 22, thereby preventing escape of compressed fuel in chamber 22 between surface 89 and skirt 74.

As best shown in FIGURE 2, the rotational axes of valves 68 and 70 intersect each other at a point below shaft 32 and along a vertical line which passes through the center of shaft 32 and which extends symmetrically between valves 68 and 70. Both valves 68 and 70 are arranged symmetrically about the symmetrical line passing through the center of shaft 32 and the rotational axes thereof are equiangularly spaced from this symmetrical line by a predetermined magnitude. The particular magnitude of arcuate separation of the axes of valves 68 and 70 depends upon the compression ratio which is desired. To this end, it will be appreciated that the engine compression ratio is dependent upon both the magnitude of arcuate separation of valves 68 and 70 and also upon the ratio of the depth of chamber 22 with respect to its diameter. In the embodiment shown herein the axes of valves 68 and 70 are angularly spaced from the symmetrical line by 30 degrees.

The radius of each skirt 74 for valves 68 and 70 is equal to the perpendicular distance between each valve axis and a line passing through the center of shaft 32 in parallel relationship to the valve axis.

By means of this construction, the chords associated with the portions of abutments 75 and 76 disposed in chamber 22 are contained in planes that radially extend from the center of shaft 32. Thus, abutments 75 and 76 are generally normal to the cylindrical periphery of rotor body 44 when they are positioned in chamber 22 to form transverse partition walls thereacross. The length of abutments 75 and 76 are such to provide a running clearance between the rotor body periphery as the abutments transversely cross chamber 22. By this structure, the leakage of fluid experienced between the bottom edge of abutments 75 and 76, and the periphery of rotor body 44 is negligible.

Thus, it will be appreciated that by rotation of valves 68 and 70, abutments 75 and 76 periodically enter and withdraw from chamber 22. When abutments 75 and 76 are positioned in chamber 22, they form transverse partitions across the piston chamber thereby dividing the chamber into separate segmental compartments.

In order to rotate valves 68 and 70 in timed relationship to the movement of vane 56, each valve is provided with a driven gear 96 which is fixedly secured to wall 72 in surrounding relationship to pin 78 as best shown in FIGURE 3. Gear 96 and its associated valve 68 or 72 are axially held in place on pin 78 by means of a nut 97 secured to the outer threaded terminal section of pin 78. Thus, gear 96 and its associated valve 68 or 70 are mounted as a unit to rotate freely about pin 78.

Each gear 96 is drivingly connected to a gear 98 non-rotatably mounted on shaft 32 by means of a drive train 100 comprising a gear 102 in constant mesh with gear 96 and rigidly secured to a stud shaft 104 which is journalled for rotation in casing 20 along an axis that extends parallel to the rotational axis of its associated valve 68 or 70. The lower end of each stud shaft 104 non-rotatable mounts a pinion 106 which is in constant mesh with gear 98.

By this construction, it will be appreciated that valves 68 and 70 are rotated at constant speeds in opposed directions in timed relationship with the movement of shaft 32 and, consequently, vane 56. According to the present embodiment, both valves 68 and 70 are rotated at the same speed as engine shaft 32.

Referring to FIGURES 1 and 2, each casing portion 82 is provided with an opening 108 to provide access to valves 68 and 70 and drive trains 100. Openings 108 are closed by flat cover plates 110 which are removable secured to casing 20 as by screws 112.

With continued reference to FIGURE 2, the means for introducing a combustible charge of fuel into chamber 22 comprises a carburetor 116 of conventional construction and having a main fuel jet 118 adapted to be connected to a source of suitable fuel (not shown) and a throttle valve 120 positioned in a fuel duct 122 downstream of jet 118.

As best shown in FIGURE 10, duct 122 interconnects carburetor 116 with an inlet port 124 formed in cover 110 for valve 70. Port 124 axially aligns with a port 128 formed in casing 20 and both ports 124 and 128 are equidistantly radially spaced from the rotational axis of valve 70. Wall 72 of valve 70 revolves in a space between the inner surface of cover 110 and a surface 129 of casing 20 so as to pass between ports 124 and 128. Arcuate valve port 77 is positioned at a spaced distance from the rotational axis of valve 70 so that it registers with ports 124 and 128 as valve 70 is rotated. Port 128 communicates with chamber 22.

Thus, when valve 70 is rotated, port 77 periodically moves into and out of registry with ports 124 and 128. Valve port 77 is substantially of longer arcuate length than port 128 so that the ports 77 and 128 remain in registry for a predetermined period of time that is long enough to admit a full charge of fuel into chamber 22. Thus, a fresh charge of fuel is drawn into chamber 22 with each rotation of gate 70 and, consequently, with each rotation of vane 56.

In accordance with the present invention, a by-pass groove 130 is formed inwardly of the internal flat wall surface of casing wall 24 and centrally between the places where the abutments 75 and 76 enter chamber 22. Groove 130 is positioned so that it is bisected by the symmetrical line which passes through the center of shaft 32. Casing exhaust port 66 is angularly positioned approximately 150° from by-pass 130 in a clockwise direction as viewed from FIGURE 2.

The arcuate length of groove 130 is sufficiently greater than the circumferential width of vane 56 immediately adjacent thereto so that fluid communication is established between the portion of chamber 22 on the leading side of vane 56 and the portion of chamber 22 on the trailing side of vane 56 as vane 56 rotates past the groove.

By this structure, it will be appreciated that when valve 70 is rotated so that abutment 76 forms a partition across chamber 22 and when vane 56 has been rotated past valve 68 in its movement toward valve 70, the fluid trapped in the compartment formed between the leading face 58 of vane 56 and abutment 76 is forced by the forward rotary movement of vane 56 through by-pass 130 and into the portion of chamber 22 on the trailing side of vane 56.

In order to ignite and burn the fuel charge drawn into chamber 22, a conventional constant ignition spark plug 134 is threadedly secured to casing skirt 26 and has its spark gap projecting into chamber 22 between valves 68 and 70 at a point that is along the symmetrical line which bisects port 130.

In operation, the engine may be started by any suitable means such as a starter (not shown) or hand crank (not shown) which may be connected to turn shaft 32 in a clockwise direction as viewed from FIGURE 2. As hereinbefore described both valves 68 and 70 rotate at the same speed as shaft 32, with valve 70 rotating in a clockwise direction and valve 68 rotating in a counterclockwise direction as viewed from FIGURE 3.

As shaft 32 is turned, vane 56 approaches abutment 76 which is moved out of chamber 22 and consequently out of the path of vane 56. After vane 56 passes valve 70, its abutment 76 re-enters chamber 22 to form a partition wall across the chamber. Abutment 76 begins to enter chamber 22 after vane 56 passes exhaust port 66 and at a point where the trailing edge of port 64 coincides with the leading edge of port 66. At this time, intake port 77 starts to rotate into registry with port 128. As intake port 77 is rotated into registry with port 128, abutment 76 re-enters chamber 22 and vane 56, having passed valve 70 establishes a partial vacuum in the compartment formed between the trailing side of vane 56 and abutment 76. As a result, a combustible charge of fuel is drawn into chamber 22 from carburetor 116. Since abutment 76 is diametrically adjacent port 77, the charge being drawn in is trapped in the compartment between the trailing face of vane 56 and abutment 76. This intake cycle continues until after vane 56 has passed valve 68 and terminates when abutment 75 re-enters chamber 22 to form a partition therein.

As rotation of vane 56 proceeds and moves past valve 70 again, the vane now begins to compress the initial fuel charge in chamber 22 and also draws in another fresh fuel charge between abutment 76 and its trailing face 60 as hereinbefore described. When vane 56 reaches a point approximately 140° ahead of valve 68, its abutment 75 withdraws from chamber 22 allowing vane 56 to move past and compressing the fuel charge between the leading face 58 and the abutment 76 which has re-entered and partitioned off chamber 22. Immediately after vane 56 passes valve 68, its abutment 75 re-enters and partitions off chamber 22.

Compressing of the fuel charge continues, and when abutment 75 has fully partitioned chamber 22, vane 56 has reached a position adjacent by-pass 130. With abutment 76 of valve 70 still in chamber 22, the now fully compressed charge is forced from the lead side of vane 56 through by-pass 130 to the trailing side of vane 56 which now forms a closed compartment with abutment 75 of valve 70. Entry of abutment 75 into chamber 22 at this time also prevents the fresh fuel charge to the rear of vane 56 from intermixing with the compressed charge which is being by-passed from the leading side to the trailing side of vane 56.

Movement of the compressed charge to the trailing side of vane 56 continues until the trailing side is approximately 10 degrees past the center of by-pass groove 130. At this point, vane 56 cuts off passage of compressed fuel through groove 130 and the compressed by-passed fuel charge between abutment 75 and the trailing side of vane 56 is ignited by spark plug 134. The ignition and consequent burning of the fuel mixture expands the combustion gases which react to drive vane 56.

When the trailing side of vane 56 has moved approximated 10 degrees past the center of by-pass groove 130, the forward edge on the leading face of vane 56 is almost in contact with abutment 76. At this time, and almost concomitantly with the ignition of the compressed fuel mixture, abutment 76 starts to withdraw from chamber 22. Since vane face 58 is inclined, it establishes a wedge shaped area between vane 56 and abutment 76. The compressed fuel charge in this wedged area is not by-passed to the trailing side of vane 56 and is swept around for admixture with the next fuel charge as abutment 76 withdraws from chamber 22 to permit passage of vane 56 thereby.

The expanding gases resulting from the ignition and burning of the fuel charge causes vane 56 to rotate through a power stroke of approximately 120 degrees and to thereby begin the compression of the previously drawn in fuel charge. At the end of the 120 degree power stroke, the leading edge of rotor exhaust port 64 coincides with the trailing edge of casing exhaust port 66 and the exhaust of the burned charge on the trailing side of vane 56 begins. The exhaust of the burned gases continues for approximately 30 degrees of rotor revolution. The circumferential magnitudes of ports 64 and 66 are such that at the completion of the 30 degree exhaust cycle, the trailing edge of rotor port 64 coincides with the leading edge of casing port 66, thereby interrupting passage from chamber 22 to the atmosphere.

Approximately 10 degrees after the exhaust cycle starts, abutment 76 begins to re-enter chamber 22. At the end of the 30 degree exhaust cycle, or after 20 degrees of rotor revolution, abutment 76 has completed its re-entry into chamber 22 forming a transverse partition thereacross.

At this time, the leading edge of fuel intake port 77 of valve 70 coincides with the trailing edge of port 128 in casing 20 and the introduction of a fresh fuel charge into chamber 22 begins. Thus, it is apparent that exhaust port 66, having moved out of registry with rotor port 64 is sealed by rotor body 44 simultaneously as the intake of the fresh charge begins. As a consequence, the fresh fuel charge drawn into chamber 22 is trapped between the trailing side of vane 56 and abutment 76 and is prevented from escaping through exhaust port 66.

The momentum of vane 56 established by the previous expansion of gases and liberation of energy, causes vane 56 to continue in its rotation and to complete the compression of the fuel charge between its leading face 58 and abutment 76 while at the same time completing the intake of a fresh fuel charge between its trailing face 60 and abutment 76 of valve 70.

The compressed charge ahead of vane 56 is by-passed and ignited as hereinbefore described and the cycles of expansion with the resulting power stroke, of compression of the charge now ahead of vane 56, and of exhaust of the burned gases behind vane 56 are repeated.

When the engine is adapted to be driven by steam or other pressure fluid, valve 68 and by-pass 130 are eliminated. The casing exhaust port 66 is repositioned to a location just ahead of abutment 76 and the arcuate extent of abutment 76 is increased to approximately 330 degrees, thus leaving an opening in the valve skirt of approximately 30 degrees.

In adapting the engine to be driven by steam or to serve as a pump, the exhaust port is preferably formed by a slot cut in the side wall of chamber 22 in parallel with the opening for abutment 76.

Steam is drawn through port 128 and enters chamber 22 in a closed compartment formed between abutment 76 and the trailing face of vane 56 to react against vane 56 and drive it in a clockwise direction as viewed from FIGURE 2. Abutment 76 is timed with rotation of vane 56 so that vane 56 will travel through an angular distance of approximately 20 degrees from the time abutment 56 begins to enter chamber 22 to the time that it has just completely withdrawn from the chamber.

When the engine is adapted to be used as a pump, the component parts thereof are modified in the same manner when it is adapted to be driven by steam as described above. Shaft 32 may be externally driven by any suitable means such as an electric motor (not shown).

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and described to be secured by United States Letters Patent is:

In a rotary engine, a casing having an internal cylindrical wall surface, a rotor mounted for rotation in said casing in concentric radially spaced relationship with said casing wall surface and forming a chamber therewith, at least one vane mounted rigid with said rotor and projecting generally radially into said chamber in running clearance with said casing wall surface, and rotatable means for periodically forming at least two circumferentially spaced apart partition surfaces across said chamber to periodically divide said chamber into segmental compartments in timed relationship with movement of said vane, said rotatable means comprising at least two rotatable valve members each having a semi-cylindrical portion forming said partition surfaces and operable upon rotation of said valve members in a predetermined direction to move transversely across said chamber and means forming an intake port in a predetermined one of said valve members for introducing a fluid into said chamber in timed relationship with the movement of said vane.

References Cited in the file of this patent

UNITED STATES PATENTS

| | | |
|---|---|---|
| 1,644,490 | Post | Oct. 4, 1927 |
| 1,655,541 | Gardner | Jan. 10, 1928 |
| 1,713,378 | Engman | May 14, 1929 |
| 1,828,207 | Stone | Oct. 20, 1931 |
| 1,960,971 | Fisher | May 29, 1934 |
| 2,722,201 | Muse | Nov. 1, 1955 |
| 2,742,882 | Porter | Apr. 24, 1956 |
| 2,897,798 | Schrougham | Aug. 4, 1959 |
| 2,939,438 | Bush | June 7, 1960 |

FOREIGN PATENTS

| | | |
|---|---|---|
| 339,761 | Germany | Aug. 6, 1921 |
| 386,356 | Germany | Dec. 8, 1923 |
| 796,601 | Great Britain | June 18, 1958 |